Jan. 22, 1929. 1,699,878
H. H. COLEMAN ET AL
DESK CALENDAR STAND
Filed May 31, 1927 2 Sheets-Sheet 1
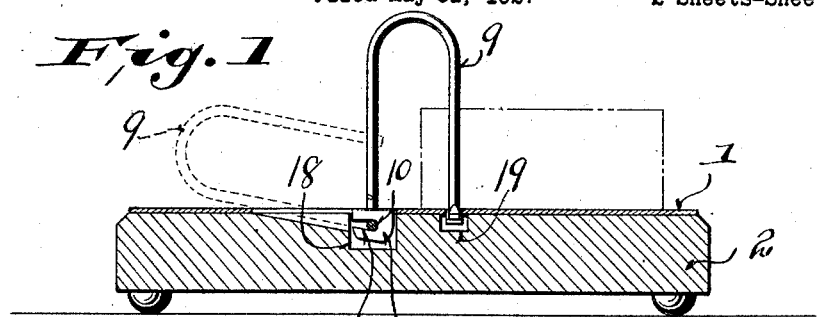
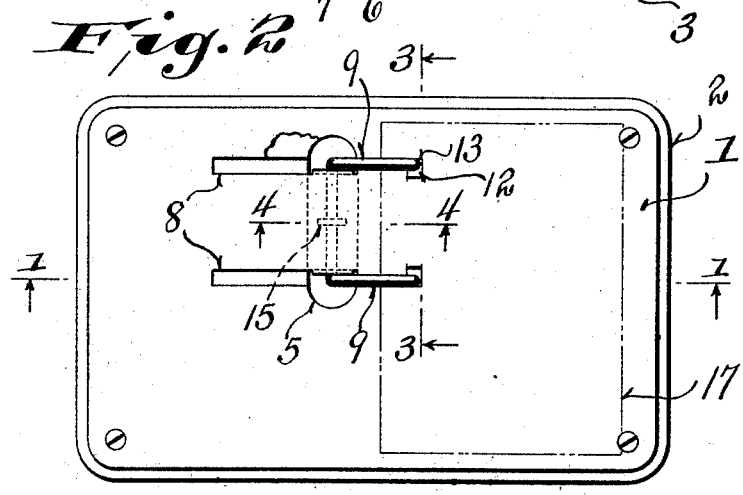
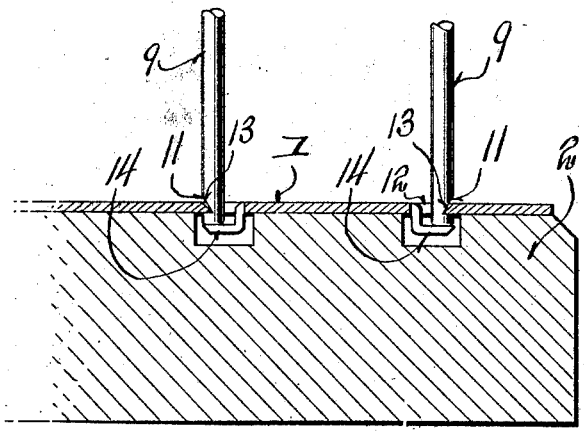
Inventors:
Henry H. Coleman
Adam Ziska Jr.

Jan. 22, 1929.
H. H. COLEMAN ET AL
1,699,878
DESK CALENDAR STAND
Filed May 31, 1927 2 Sheets-Sheet 2
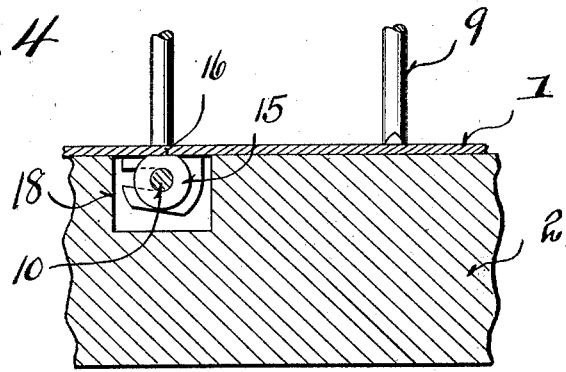
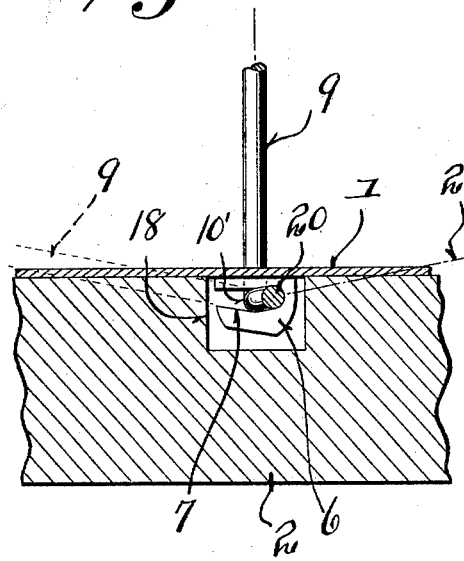
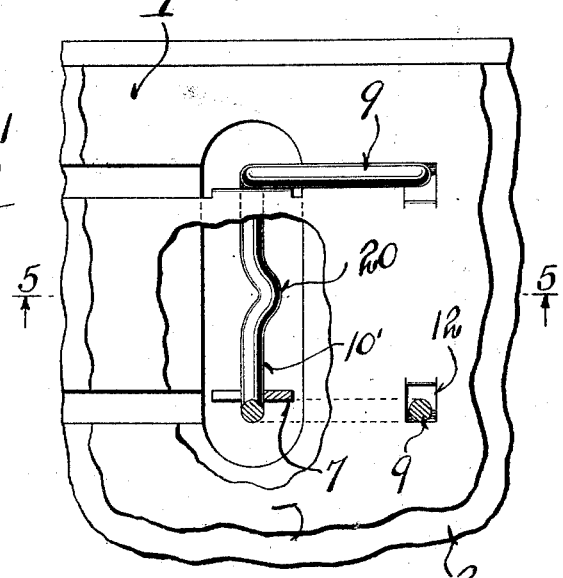
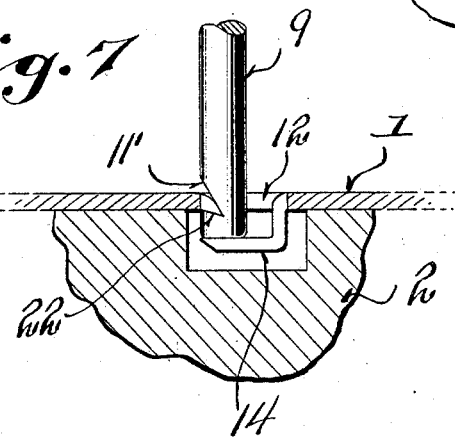
Inventors:
Henry H. Coleman
Adam Ziska Jr.

Patented Jan. 22, 1929.

1,699,878

UNITED STATES PATENT OFFICE.

HENRY H. COLEMAN AND ADAM ZISKA, JR., OF MILWAUKEE, WISCONSIN, ASSIGNORS BY DIRECT AND MESNE ASSIGNMENTS, TO COLUMBIAN ART WORKS, OF MILWAUKEE, WISCONSIN.

DESK-CALENDAR STAND.

Application filed May 31, 1927. Serial No. 195,407.

This invention relates to desk calendar stands.

In desk calendar stands as heretofore constructed, it is the usual practice to provide staple-like members which are held in place by auxiliary means and which are very readily unlocked inadvertently by the ordinary jars or shocks to which a desk calendar stand is subjected in its customary use.

Objects of this invention are to provide a desk calendar stand of novel construction which overcomes the defects noted above and which is so made that it consists essentially of two main members supported by a suitable base, as desired, with the members cooperating to insure a mode of locking which can not be inadvertently detached by the ordinary jars and shocks to which the desk calendar stand is subjected in the ordinary use of the device, but which may be very readily unlocked to permit renewal of the calendar by a simple operation and without the use of auxiliary devices.

Further objects are to provide a desk calendar stand which is so made that the device consists of a bed plate and a pair of integrally joined looped or staple-like members cooperating directly with the bed plate to secure the pivotal connection and also the detachable connection without the use of auxiliary fasteners or auxiliary bearing members and which, therefore, may be constructed with the utmost cheapness with full assurance that it will function with certainty and in a reliable manner to avoid the defects noted above.

Further objects are to provide a desk calendar stand which is formed of two looped members upon which the desk calendar leaves are threaded with the members pivoted about one end thereof and so constructed with relation to the base plate that they will not freely flap or rock when unfastened, but will be frictionally held in a position to facilitate substitution of calendar pads without requiring the operator to hold the looped members in place while the calendar pad is being threaded thereon.

Embodiments of the invention are shown in the accompanying drawings in which:

Figure 1 is a vertical sectional view through the device corresponding to a section on the line 1—1 of Figure 2;

Figure 2 is a plan view of the device with a part broken away;

Figure 3 is an enlarged sectional view on the line 3—3 of Figure 2;

Figure 4 is an enlarged sectional view on the line 4—4 of Figure 2;

Figure 5 is a fragmentary view corresponding to Figure 4 showing a modified form of the invention, such view corresponding to a section on the line 5—5 of Figure 6;

Figure 6 is a fragmentary plan view of the structure shown in Figure 5, such view being partly in section;

Figure 7 is an enlarged fragmentary view showing a further modification of the invention.

Referring to Figures 1 to 4, it will be seen that the desk calendar stand comprises a base plate 1 preferably formed of metal and secured in any suitable manner to a base 2 which may, if desired, be provided with legs 3. The legs, of course, may be of rubber or may be otherwise formed so as to avoid scratching the desk.

The base plate 1 is provided with a pair of roughly semi-circular cutout portions 5 which provide downturned lips 6 struck from the body of the base plate, as shown most clearly in Figure 1. These lips are slotted, as indicated by the reference character 7, to integrally form parallel sided slots extending inwardly from one edge of the lips for a purpose hereinafter to appear. Further, it is to be noted from Figures 1 and 2, that the base plate 1 is provided with a plurality of slots or rectangular cutouts 8 which merge into the cutouts or openings 5.

A pair of staple-like members 9 constituting inverted looped portions with their open sides presented downwardly are integrally joined by a transverse member or shaft 10. These members 9 and 10 are preferably formed from springy relatively heavy wire. The transverse shaft 10 is positioned within the slots or notches 7 of the lips 6, and in order to hold such shaft in place, the ends of the members 6 are given a light tap with a hammer to contract the outer end of the slot and thus prevent lateral shifting of the shaft 10.

The forward ends or free ends of the members 9 are provided with notched portions 11 located on their outer sides, as shown most clearly in Figure 3. These notched portions 11 are provided with bevelled upper faces and abrupt lower shoulders, as shown in the figure. They are adapted to be passed through apertures 12 formed in the base plate 1 and to snap outwardly away from each other into engagement with the edges of the base plate at the openings 12. It is to be noted that these edges are bevelled, as indicated by the reference character 13 in Figures 2 and 3, so as to furnish cam surfaces on the outer edges of the apertures 12 to guide the ends of the spring arms 9 inwardly and thus allow them to snap outwardly when the notched portions 11 register with the outer edges at the apertures 12. Further, it is to be noted that the material from the aperture 12 is struck downwardly to furnish a stop 14 for each of the members 9 to thus limit their downward motion, as shown most clearly in Figure 3.

It is to be noted further that a disc 15 is rigidly attached to the shaft 10, preferably adjacent the center of said shaft, and bears against the underside of the base plate 1. As may be seen most clearly from Figure 4, this disc 15 is provided with a flattened face 16 adapted to contact flatly with the underside of the bed plate 1 when the device is in locked position.

When it is desired to renew the calendar or, in other words, to interchange the pad, indicated in imaginary lines, and by the reference character 17, all that is necessary is to squeeze the free ends of the loops 9 towards each other, thus detaching their notched portions from the bed plate and thereafter rock such looped portions into the dotted line position shown in Figure 1. The rear arms of the looped portions pass into the slots 8 in the bed plate and the friction disc 15 bearing against the underside of the bed plate 1 holds such looped portions in this last-described position. The desk calendar may, therefore, be very readily detached from the portions 9 and a new calendar substituted. Thereafter, all that is necessary to complete the reassembling or the reconditioning of the device is to merely rock the members 9 into their vertical or full line position, as shown in Figure 1. The lower free ends of the members 9 encounter the bevelled faces 13 in the apertures 12 and thus move the members 9 inwardly towards each other against their inherently springy action. When the members 9 contact with the lips 14 or stops, their notched portions 11 receive the corresponding portions of the base plate and thus firmly lock the device against inadvertent detachment or opening movement.

Even if the calendar is subjected to unusual shocks or blows, the device will not unlock as it is necessary to simultaneously apply pressure to opposite sides of the two members 9 in order to detach them. A blow from any single direction imparted to either one or both of the members will not detach them. It is necessary to apply pressure from opposite directions and simultaneously in order to cause the members to free themselves from the bed plate 1.

It will be seen, therefore, that a desk pad calendar has been provided which is securely locked against all inadvertent blows or jars to which it may be subjected in the ordinary use, and it will be seen further that the device is of extreme simplicity and consists essentially of two main parts without any auxiliary fasteners whatsoever.

Obviously, the base member 2 may be cut out, as indicated at 18 and 19, to accommodate the corresponding portions of the apparatus.

The same inventive idea is followed in the form shown in Figures 5 and 6. However, the friction disc 15 is omitted and in place of such disc the connecting shaft 10' is provided with a bulged or offset portion 20 intermediate its ends. This offset portion is not arranged at exactly right angles to the vertical portions of the members 9, as may be seen from Figure 5, but at slightly less than 90°. The plane of the central part of the offset portion 20 is indicated by the imaginary line 21 in Figure 5. The purpose of this offset is to position the offset portion directly vertically beneath the bed plate 1, when the members 9 are rocked into their dotted line position shown in Figure 5. Thus, in both forms of the invention, means are provided for frictionally holding the device while the calendar is being interchanged to prevent flapping or pivotal motion of the looped members. If desired, the portion of the bed plate 1 immediately adjacent the apertures 12 may be slightly depressed, as indicated by the reference character 22 in Figure 7 to provide a slightly downwardly extending tongue instead of a flattened bottom surface. The bottom portion of the notches 11' are similarly slanted, as shown in Figure 7, to assure additional security in locking. This bending may be done at the time that the apertures are punched and the members 14 struck downwardly therefrom.

It is to be noted that in all forms of the invention the utmost simplicity as well as the utmost security of interlocking is attained.

It is to be noted that other means may be employed to offer a frictional resistance to the rocking motion of the looped members. For instance, the edges of the slots may bind against the looped members when they are rocked to offer the desired frictional resistance.

It will be seen further that this security is attained without incurring additional expense, but in reality by a simplified construction of the apparatus.

It is to be noted further that the device is of attractive and eminently practical construction.

Although the device has been described as particularly adapted for a desk calendar, it is to be distinctly understood that other types of pads may obviously be used without departing from the spirit of this invention. Therefore, although the invention has been described in considerable detail, such description is intended as illustrative rather than limiting as the invention may be variously embodied and as the scope of such invention is to be determined as claimed.

We claim:

1. A desk calendar stand comprising a bed plate having a pair of apertures therethrough, a pair of rigidly joined looped resilient members for the reception of a calendar pad, said members being pivotally carried by said bed plate and having parallel downwardly extending arms provided with notches on their outer sides and adapted to enter said apertures, said bed plate having bevelled portions adjacent the outer side of said apertures for camming the ends of said arms into said apertures, said bed plate having spaced tongues struck downwardly from said apertures and constituting stops for the ends of the arms, said stops underlying the arms for all positions of said arms while said arms are in said apertures.

2. A desk calendar stand comprising a bed plate having a pair of notched lips struck downwardly therefrom and arranged in parallelism, said lips having lower tongues formed by the notches, a pair of loop members adapted to receive a calendar pad and joined by an integral transverse shaft seated in said notches, the tongues being bent towards said plate to retain said shaft against displacement, said bed plate having apertures therethrough provided with bevelled outer edges and having tongues struck from the apertures constituting stops spaced downwardly from said plate, said loop members having free arms provided with notches adjacent their ends and on their outer side and adapted to enter the apertures and contact with the stops with the notches engaging the plate at the bevelled edges.

3. A desk calendar stand comprising a bed plate having a pair of notched lips struck downwardly therefrom and arranged in parallelism and provided with tongues below the notches, a pair of loop members adapted to receive a calendar pad and joined by an integral transverse shaft seated in said notches, the tongues being bent towards said plate to retain said shaft against displacement, said bed plate having apertures therethrough provided with bevelled outer edges and having tongues struck from the apertures constituting stops spaced downwardly from said plate, said loop members having free arms provided with notches adjacent their ends and on their outer side and adapted to enter the apertures and contact with the stops with the notches engaging the plate at the apertures, said loop members being adapted to be rocked about said shaft for interchanging calendar pads, and said shaft having means for frictionally binding against said bed plate when said loop members are in the rocked position.

4. A desk calendar stand comprising a bed plate having a pair of notched lips struck downwardly therefrom and arranged in parallelism and provided with tongues below the notches, a pair of loop members adapted to receive a calendar pad and joined by an integral transverse shaft seated in said notches, the tongues being bent towards said plate to retain said shaft against displacement, said bed plate having apertures therethrough provided with bevelled outer edges and having tongues constituting stops spaced downwardly from said plate and struck from the apertures, said loop members having free arms provided with notches adjacent their ends and on their outer side and adapted to enter the apertures and contact with the stops with the notches engaging the plate at the apertures, said loop members being adapted to be rocked about said shaft for interengaging calendar pads, and means for offering a frictional resistance to the motion of the loop members.

In testimony that we claim the foregoing we have hereunto set our hands at Milwaukee, in the county of Milwaukee and State of Wisconsin.

HENRY H. COLEMAN.
ADAM ZISKA, JR.